United States Patent
Carey et al.

(10) Patent No.: US 9,677,496 B2
(45) Date of Patent: Jun. 13, 2017

(54) SYSTEM AND METHOD OF INJECTOR CONTROL FOR MULTIPULSE FUEL INJECTION

(71) Applicant: Cummins Inc., Columbus, IN (US)

(72) Inventors: David M. Carey, Greenwood, IN (US); Eric A. Benham, Columbus, IN (US)

(73) Assignee: Cummins Inc., Columbus, IN (US)

( * ) Notice: Subject to any disclaimer, the term of this patent is extended or adjusted under 35 U.S.C. 154(b) by 391 days.

(21) Appl. No.: 14/332,439

(22) Filed: Jul. 16, 2014

(65) Prior Publication Data

US 2016/0017837 A1 Jan. 21, 2016

(51) Int. Cl.
*F02D 41/00* (2006.01)
*F02D 41/40* (2006.01)
*F02D 41/14* (2006.01)

(52) U.S. Cl.
CPC .... *F02D 41/402* (2013.01); *F02D 2041/1433* (2013.01); *F02D 2200/0602* (2013.01); *F02D 2200/0606* (2013.01); *F02D 2200/0616* (2013.01); *Y02T 10/44* (2013.01)

(58) Field of Classification Search
CPC .. F02M 63/0225; F02M 63/023; F02M 65/00; F02M 65/003; F02M 65/005; F02D 2250/31; F02D 2041/1433; F02D 2041/141; F02D 2041/1409
USPC .................................................. 123/458, 496
See application file for complete search history.

(56) References Cited

U.S. PATENT DOCUMENTS

| | | | | |
|---|---|---|---|---|
| 5,609,136 A | * | 3/1997 | Tuken | F02D 41/14 123/357 |
| 5,771,861 A | * | 6/1998 | Musser | F02D 41/1401 123/357 |
| 6,234,148 B1 | * | 5/2001 | Hartke | F02D 41/222 123/198 D |
| 6,439,201 B1 | * | 8/2002 | Gillis | F02D 41/3827 123/458 |
| 6,439,202 B1 | * | 8/2002 | Carroll, III | F02D 41/3836 123/300 |
| 6,516,773 B2 | | 2/2003 | Dutart et al. | |
| 6,557,530 B1 | * | 5/2003 | Benson | F02D 41/22 123/447 |
| 6,823,834 B2 | | 11/2004 | Benson et al. | |
| 7,021,278 B2 | * | 4/2006 | Ishizuka | F02D 41/1401 123/299 |

(Continued)

OTHER PUBLICATIONS

Written Opinion; International Searching Authority; International PCT Application No. PCT/US2015/040500; Oct. 7, 2015; 11 pages.

*Primary Examiner* — Thomas Moulis
(74) *Attorney, Agent, or Firm* — Taft Stettinius & Hollister LLP

(57) ABSTRACT

A system, apparatus, and method are disclosed for controlling a fuel injector using multipulse fuel injection. According to at least one aspect of the present disclosure, the system includes a fuel sequence controller configured for use with a fuel injector having an injector configuration modeled by a body pressure characteristic that includes a rail pressure and an injection rate shape, where the fuel sequence controller is structured to determine an estimate of the injected fuel quantity delivered from the fuel injector at the determined body pressure characteristic.

19 Claims, 12 Drawing Sheets

(56) References Cited

U.S. PATENT DOCUMENTS

| | | | |
|---|---|---|---|
| 7,111,614 B1* | 9/2006 | Coldren | F02M 45/02 |
| | | | 123/299 |
| 7,219,005 B2 | 5/2007 | Mazet | |
| 7,273,038 B2 | 9/2007 | Hayakawa | |
| 7,406,951 B2 | 8/2008 | Stoecklein | |
| 7,472,689 B2* | 1/2009 | Ishizuka | F02D 41/20 |
| | | | 123/446 |
| 7,900,605 B2* | 3/2011 | Dingle | F02D 41/3827 |
| | | | 123/447 |
| 7,917,281 B2 | 3/2011 | Yamada et al. | |
| 9,429,093 B2* | 8/2016 | Empacher | F02D 41/2467 |
| 2003/0121501 A1* | 7/2003 | Barnes | F02D 41/2422 |
| | | | 123/446 |
| 2004/0154593 A1* | 8/2004 | Corcione | F02D 41/3809 |
| | | | 123/447 |
| 2008/0047527 A1* | 2/2008 | Sun | F02M 57/025 |
| | | | 123/446 |
| 2009/0063010 A1 | 3/2009 | Nakata et al. | |
| 2009/0164094 A1* | 6/2009 | Geveci | F02D 41/0087 |
| | | | 701/103 |
| 2009/0206184 A1 | 8/2009 | Yan | |
| 2010/0199951 A1* | 8/2010 | Cinpinski | F02D 41/2467 |
| | | | 123/456 |
| 2010/0313853 A1 | 12/2010 | Morris et al. | |
| 2011/0016959 A1* | 1/2011 | Hermes | F02D 41/20 |
| | | | 73/114.51 |
| 2011/0048379 A1* | 3/2011 | Sommars | F02M 47/027 |
| | | | 123/456 |
| 2011/0106409 A1* | 5/2011 | Walter | F02D 41/2432 |
| | | | 701/103 |
| 2011/0253105 A1* | 10/2011 | Kim | F02M 47/027 |
| | | | 123/445 |
| 2011/0307161 A1* | 12/2011 | Sommerer | F02D 41/222 |
| | | | 701/103 |
| 2011/0313639 A1* | 12/2011 | Hemmerlein | F02M 63/0225 |
| | | | 701/103 |
| 2012/0035833 A1* | 2/2012 | Melis | F02D 41/401 |
| | | | 701/104 |
| 2012/0048239 A1 | 3/2012 | Jalal et al. | |
| 2012/0330576 A1* | 12/2012 | Mikami | F02M 57/005 |
| | | | 702/50 |
| 2013/0327300 A1* | 12/2013 | Nonoyama | F02D 41/30 |
| | | | 123/478 |
| 2014/0034022 A1* | 2/2014 | Hu | F02D 41/3845 |
| | | | 123/456 |
| 2014/0283792 A1* | 9/2014 | Benson | F02D 41/2467 |
| | | | 123/478 |
| 2014/0311453 A1* | 10/2014 | Christ | F02D 41/3809 |
| | | | 123/456 |
| 2014/0311457 A1* | 10/2014 | Christ | F02D 41/30 |
| | | | 123/478 |
| 2015/0034048 A1* | 2/2015 | Walter | F02D 41/1498 |
| | | | 123/445 |
| 2015/0112576 A1* | 4/2015 | Watanabe | F02D 41/1401 |
| | | | 701/104 |
| 2016/0032856 A1* | 2/2016 | Shaver | F02M 45/12 |
| | | | 123/482 |

* cited by examiner

102 – actual curve
104 – modeled curve
106 – start delay
108 – end delay
110 – peak rate
112 – opening rate slope
114 – closing rate slope
116 – injection command 204– modeled curve
206– start delay
208– end delay
210– peak rate
212– opening time to peak
214– closing time to peak
116– injection command
218- injection duration 204— original curve
304 — adjusted curve
306— start delay
308— end delay
310— peak rate
312— opening time to peak
314— closing time to peak
116— injection command
318 - injection duration

SYSTEM AND METHOD OF INJECTOR CONTROL FOR MULTIPULSE FUEL INJECTION

TECHNICAL FIELD

The present disclosure generally relates to fuel injectors, particularly high pressure fuel injectors for internal combustion engines.

BACKGROUND

Fuel injection systems using fuel injectors are commonly used to control the flow of fuel into each cylinder of an internal combustion engine. The fuel injector is generally designed to move a valve to open a port to thereby spray a quantity of fuel into a corresponding cylinder, and then move the valve to close the port to stop the spray of fuel. Certain fuel injection systems are configured to spray fuel into the cylinder in multiple shots within a single cycle of the engine, instead of a single shot per cycle, which may be referred to as multipulse fuel injection. Typically, multipulse fuel injection include two pulses (e.g., a "pilot" pulse followed by a "main" pulse) or three pulses (e.g., a pilot pulse followed by a main pulse followed by a "post" pulse), though many other combinations of two, three, or more pulses are common. A fundamental problem with multipulse fuel injection is that latter pulses that follow preceding pulses are affected by the pressure disturbance created by the preceding pulses. When the valve closes the port of the fuel injector at the end of each pulse, a fluid hammer effect occurs in the injector body volume at the moment when the valve closes, resulting in pressure pulsations in the injector body. Due to the relatively small volume of a conventional fuel injector body, these pressure disturbances can be significant and can affect the amount of fuel delivered from the injector. Latter pulses will deliver more or less fuel than an equivalent single-pulse event, depending on the time interval between the pulses and the magnitude and shape of the pressure disturbance created by the preceding pulse. The effect of the pressure disturbances is compounded by the addition of more pulses, leading to poor control of the fuel injected into the engine. Accordingly, there remains a need for further contributions in this area of technology.

SUMMARY

A system, apparatus, and method are disclosed for diagnosing and adjusting control of a fuel injector used in multipulse fuel injection sequence. Other embodiments include unique methods, systems, and apparatus to tune and control a fuel injector. This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
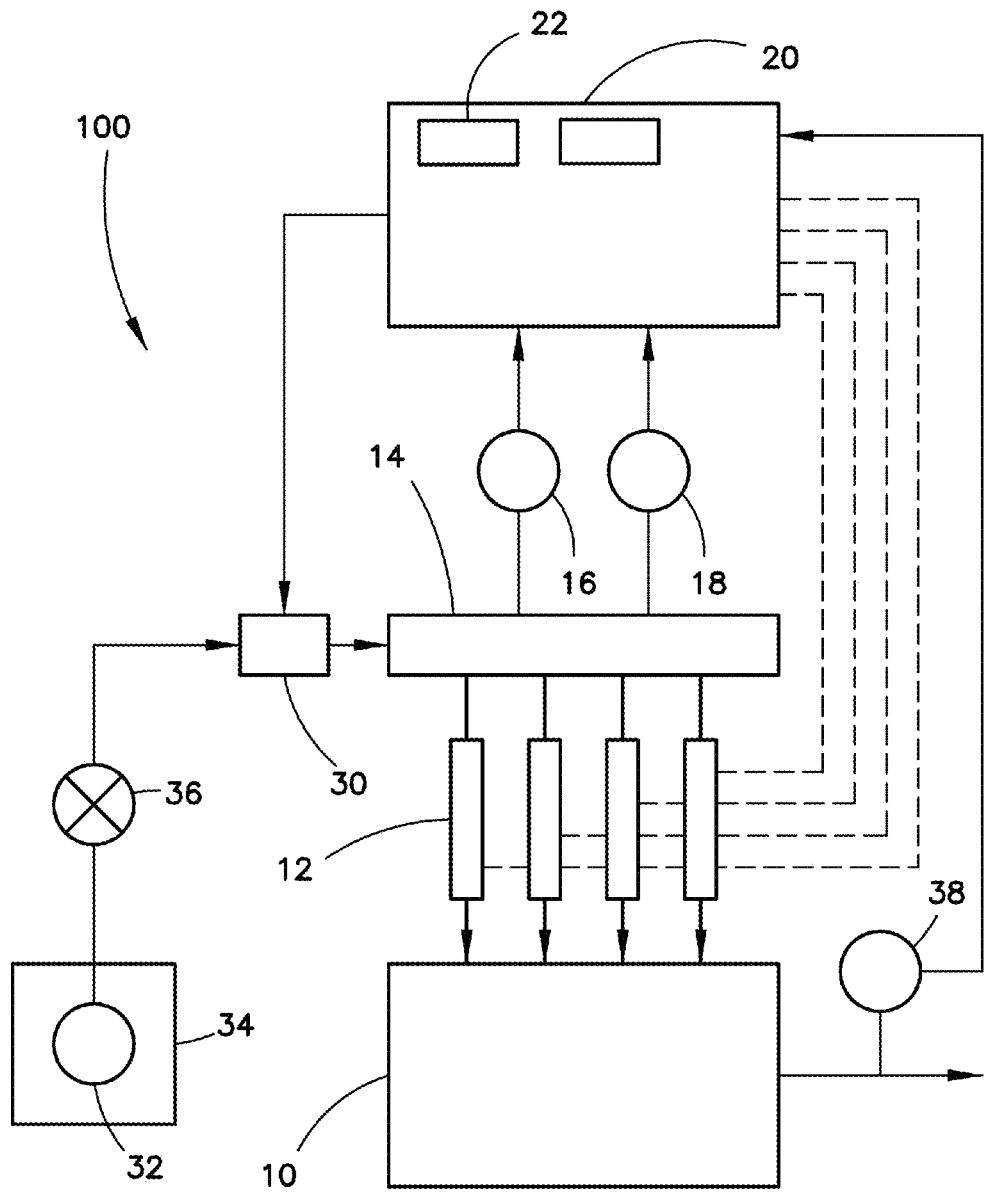
FIG. 1 is a schematic block diagram of an embodiment of an engine system according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

An exemplary system includes an internal combustion engine having a common rail fuel system and at least one common rail fuel injector. Example systems may include any number of common rail fuel injectors and may include multiple banks of fuel injectors. The system includes a means for modeling the fuel injector fuel quantity delivered as a function of an injector on-time and a rail pressure of the common rail such that an actual injected fuel quantity will match a commanded fuel quantity at very operating condition. A non-limiting example means for modeling the fuel injector fuel quantity delivered as a function of an injector on-time and a rail pressure is described following. Any means for modeling the fuel injector fuel quantity delivered as a function of a rail pressure otherwise described herein is also contemplated herein. Such a model may include look-up references tables or a set of calculations and may be static or adaptive to the changing conditions of the system. In one aspect of the present disclosure, the system includes a means for compensating for the variation in fuel injector fuel quantity that occurs in latter pulses of a multipulse fuel injection sequence, including for injectors with variable injection characteristics. The means of compensation may include modeling the injection characteristics of each individual injector and the pressure disturbance created by a preceding pulse of an injector with certain injection characteristics. Given a model for certain injection characteristics and the resulting pressure disturbance, commanded on-time and/or pulse separation adjustments may be determined from the rail pressure and temperature and applied to the control structure as described further herein.

According to at least one embodiment of the present the disclosure as shown in FIG. 1, a system 100 may include an engine 10 including one or more fuel injectors 12. The engine 10 may be an internal combustion engine, including but not limited to a spark-ignition engine, using gasoline, alcohol, a combination thereof, or other suitable compound for fuel, or a compression-ignition engine, using diesel or other suitable fuel. The engine 10 may have one or more combustion cylinders (not shown) to generate mechanical power from the combustion of a fuel. The fuel injectors 12 are in fluid communication with the engine 10 and are structured to introduce the fuel into each cylinder. Though four fuel injectors 12 are depicted in FIG. 1, the engine 10 may include fewer or greater numbers of fuel injectors 12. In certain embodiments, the engine 10 may include one fuel injector 12 for each cylinder. The fuel injectors 12 may be in fluid communication with a common fuel rail 14, which supplies fuel at relatively high pressure to each fuel injector 12. The rail 14 enables the pressure of the fuel supplied to the fuel injectors 12 (hereinafter "the rail pressure") to be independent of engine speed and load conditions, which further enables the engine 10 to produce higher torque at low engine speeds. The fuel injector 12 further includes a body having a volume that is small relative to the volume of the rail 14. Consequently, in operation, the pressure within the body of the injector 12 (hereinafter "the body pressure") may fluctuate relative to the rail pressure.

Fuel may be supplied to the rail 14 by a high pressure pump 30. In certain embodiments, the high pressure pump may be fed by a relatively low pressure fuel circuit including a booster pump 32, which may be immersed in a tank 34 containing the fuel. A fuel regulator 36 may control the flow of fuel from the tank 34 to the high pressure pump 30 as shown in FIG. 1.

The system 100 may further include a controller 20 in communication with the engine 10 and configured to control one or more aspects of the engine 10, including controlling the injection of fuel into the engine 10 via the fuel injectors 12. Accordingly, the controller 20 may be in communication with the fuel injectors 12 and configured to command each fuel injector 12 on and off at prescribed times to inject fuel into the engine 10 as desired. The controller 20 may include one or more modules 22 configured to execute operations of the controller 20 as described further herein.

The controller 20 may be further structured to control other parameters of the engine 10, which may include aspects of the engine 10 that may be controlled with an actuator activated by the controller 20. Specifically, the controller 20 may be in communication with actuators and sensors for receiving and processing sensor input and transmitting actuator output signals. Actuators may include, but not be limited to, the fuel injectors 12. The sensors may include any suitable devices to monitor parameters and functions of the system 100. For example, the sensors may include a pressure sensor 16 in communication with the rail 14 and structured to communicate a measurement of the pressure within the rail 14 to the controller 20 as shown in FIG. 1. In at least one embodiment, the system 100 may include a temperature sensor 18, including but not limited to a thermocouple or thermistor, in communication with the rail 14 and structured to communicate a measurement of the temperature within the rail 14 to the controller 20 as shown in FIG. 1. In at least one embodiment, the system 100 may include an oxygen sensor 38 (i.e., a lambda sensor) in communication with the controller 20 and structured to determine characteristics of exhaust gases generated and expelled by the engine 10. In one example, the oxygen sensor 38 may determine the concentration of oxygen in the exhaust gases as a proxy for the concentration of regulated emissions.

As will be appreciated by the description that follows, the techniques described herein that relate fuel injection parameters, such as relating estimated injected fuel quantity to an injection pressure response parameter associated with an injector pressure model, can be implemented in the controller 20, which may include one or more modules for controlling different aspects of the system 100. In one form the controller 20 is an engine controller such as a diesel engine controller. The controller 20 may be comprised of digital circuitry, analog circuitry, or a hybrid combination of both of these types. Also, the controller 20 may be programmable, an integrated state machine, or a hybrid combination thereof. The controller 20 may include one or more Arithmetic Logic Units (ALUs), Central Processing Units (CPUs), memories, limiters, conditioners, filters, format converters, or the like which are not shown to preserve clarity. In one form, the controller 20 is of a programmable variety that executes algorithms and processes data in accordance with operating logic that is defined by programming instructions (such as software or firmware). Alternatively or additionally, operating logic for the controller 20 may be at least partially defined by hardwired logic or other hardware.

In addition to the types of sensors described herein, any other suitable sensors and their associated parameters may be encompassed by the system and methods. Accordingly, the sensors may include any suitable device used to sense any relevant physical parameters including electrical, mechanical, and chemical parameters of the engine system 100. As used herein, the term "sensors" may include any suitable hardware and/or software used to sense any engine system parameter and/or various combinations of such parameters either directly or indirectly.

Figure 2A:
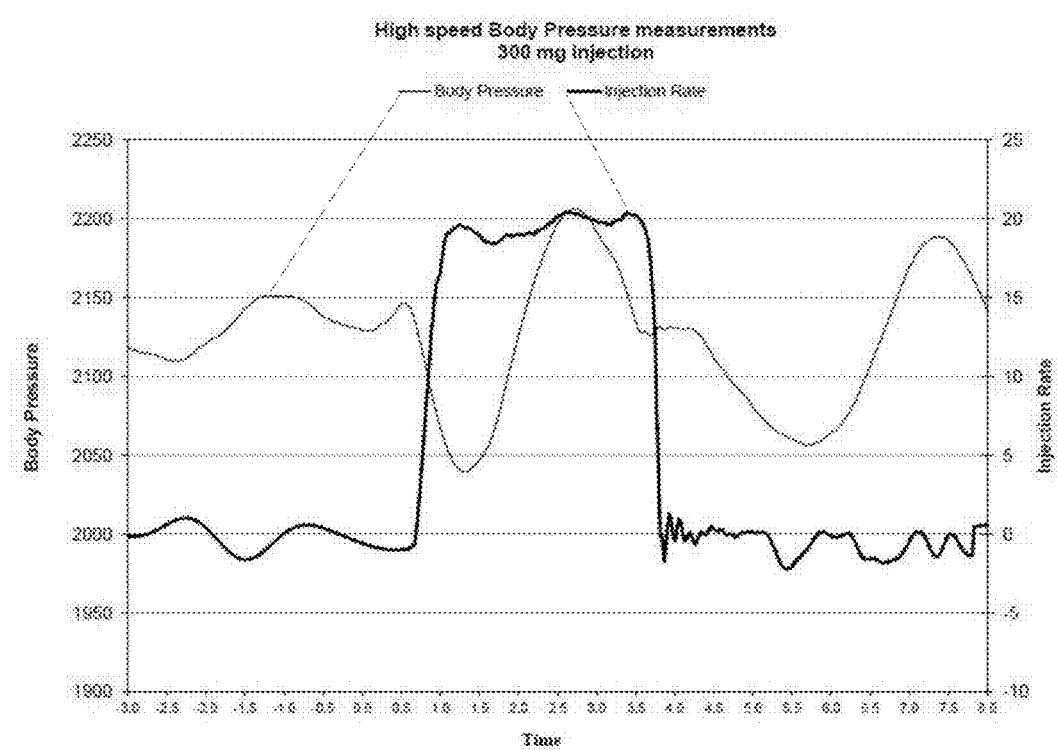
FIG. 2A is a chart of body pressure in bars (bar) and injection rate in milligrams per millisecond (mg/msec) over time in milliseconds for a 300 mg injection of an exemplary engine system.

FIG. 2A illustrates the body pressure response to a single injection of 300 milligrams (mg) of fuel from an exemplary fuel injector connected to a common fuel rail having a nominal pressure of approximately 2100 bar. FIG. 2A presents the body pressure of the fuel injector in bars (bar) over time in milliseconds (msec) and the rate of injection in milligrams per millisecond (mg/msec) over the same period. The rate of injection curve may be referred to as the "injection rate shape" of the injector from the start of injection ("SOI") to the end of injection ("EOI"). SOI is when the injector actually begins injecting fuel independent of when the command on-time is communicated to the injector. Similarly, EOI is when the injector actually stops injecting fuel independent of when the command off-time occurs. Accordingly, the injection rate shape includes the duration of the actual fuel pulse from SOI to EOI (i.e., not the commanded duration from commanded on- and off-times). The quantity of fuel dispensed from the injector is dependent upon the amount of pressure driving the injector and may be quantified by the area under the rate of injection curve.

As shown in FIG. 2A, the body pressure fluctuates in response to actuation of the injector. Specifically, at SOI the body pressure initially drops as the injector opens, and the rate of flow of fuel through the injector increases rapidly. After the initial transient drop, the body pressure then increases as the rail pressure drives flow through the body. At EOI, the body pressure may peak as the injector closes and momentum of the fuel flowing through the injector is stopped. The pressure wave caused by the closing of the injector at EOI is commonly referred to as a "fluid hammer." As shown in FIG. 2A, the pressure wave then oscillates by nearly +/−200 bar within the body though the injection rate has returned substantially to zero (i.e., no flow) as seen in the fluctuation of the body pressure after EOI. Because the flow rate of the fuel from the injector is driven by the body pressure, the fluctuation of the body pressure demonstrated in FIG. 2A may affect the fuel quantity delivered by a latter injection pulse, depending on the interval period between pulses.

Figure 2B:
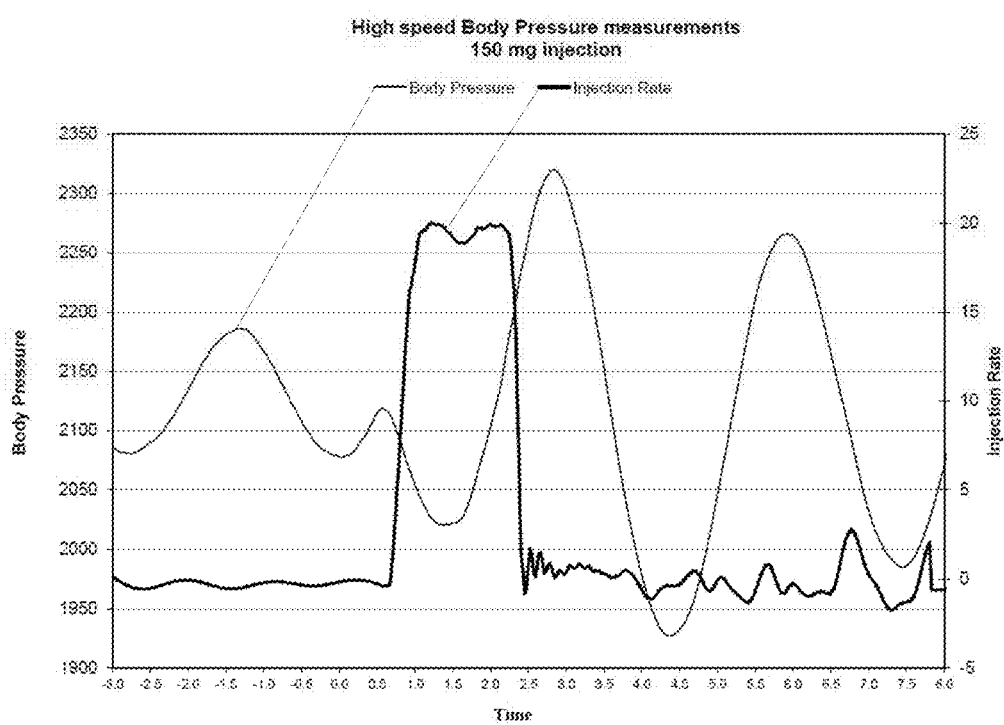
FIG. 2B is a chart of body pressure in bars (bar) and injection rate in milligrams per millisecond (mg/msec) over time in milliseconds for a 150 mg injection of an exemplary engine system.
Figure 2C:
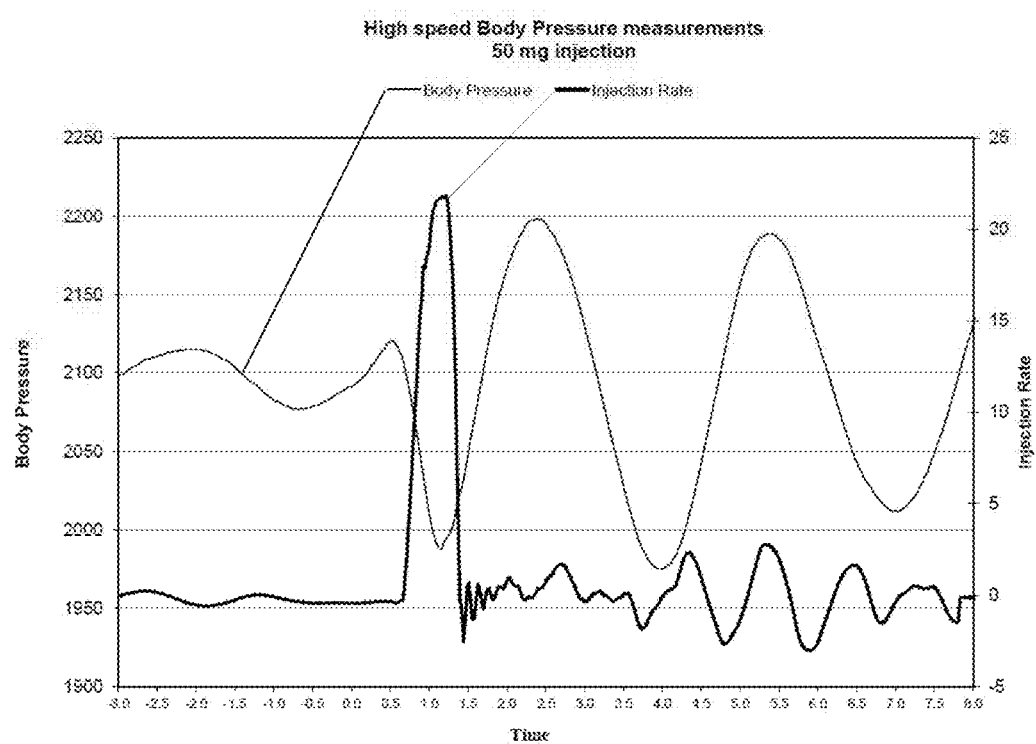
FIG. 2C is a chart of body pressure in bars (bar) and injection rate in milligrams per millisecond (mg/msec) over time in milliseconds for a 50 mg injection of an exemplary engine system.

FIG. 2B illustrates the body pressure response to a single injection of 150 mg of fuel from an exemplary fuel injector connected to a rail having a nominal pressure of approximately 2100 bar. Though the duration from SOI to EOI is lesser than the condition illustrated in FIG. 2A, a similar post-EOI oscillation in the body pressure is evident. FIG. 2C illustrates the body pressure response to a single injection of 50 mg of fuel from an exemplary fuel injector connected to a rail having a nominal pressure of approximately 2100 bar. Though the duration from SOI to EOI is lesser than the conditions illustrated in FIGS. 2A and 2B, a similar post-EOI oscillation in the body pressure is evident. A comparison of the post-EOI body pressure responses illustrated in FIGS. 2A, 2B and 2C reveals that the phase and the amplitude of the resulting pressure wave is dependent upon the timing of SOI and the injection duration. Such a comparison further indicates that, in a multipulse injection sequence, the body pressure at SOI of a latter injection pulse will be dependent on the timing of the latter injection pulse (e.g., a main pulse) relative to the pressure wave generated by the preceding pulse (e.g., a pilot pulse). Thus, there is an interaction between pulses in a multipulse injection sequence that affects the total fueling quantity delivered by the multipulse injection sequence in a single cycle of the engine. Though it is possible to account for this pulse interaction, to some extent, in the calibration of combustion maps that command injection quantities, rail pressure, and pulse separations, such calibration work is typically performed with nominal (or a small sample of) injector hardware. Normal production variation and age-related changes in injector performance will impact these multipulse interactions and thus, the intended performance of the engine in terms of torque output for a given fueling command, emissions, and fuel economy.

The pressure wave generated in the body of a fuel injector 12 is a function of various parameters, including stable characteristics that do not vary significantly between injectors (e.g., body volume), as well as characteristics that are variable between injectors and over time for a given injector.

In at least one embodiment according to the present disclosure, a dynamic multi-input, single output body pressure model has been developed to estimate the body pressure using an injection rate shape and the rail pressure. The frequency-domain transfer function form of an exemplary model according to the present disclosure includes:

$$P_B(S) = \frac{\omega_n^2}{S^2 + 2\xi\omega_n + \omega_n^2} P_R(S) - \frac{(1 + D(S)/U(S))(S + 2\xi\omega_n)C_I}{S^2 + 2\xi\omega_n + \omega_n^2} U(S) \quad \text{(Equation 1)}$$

where $P_B(S)$ is the injector body pressure; $P_R(S)$ is the rail pressure; $U(S)$ is the injection rate shape; $D(S)$ is the drain flow shape; $C_I$ is the capacitance of the injector; $\omega_n$ is the natural frequency of the injector body; $\xi$ is the damping ratio of the injector body; and S is a complex number defining magnitude and frequency. Additional factors, such as rail temperature and initial fueling rate, may be included in the model either directly or indirectly via the effect of rail temperature on the disclosed model parameters of EQ. 1. Further, the body pressure model may yield a body pressure rate equation by differentiating EQ. 1. The body pressure rate may be used to further define the response of the injector to the preceding pulse.

Regarding the inputs into EQ. 1, the rail pressure $P_R(S)$ may be determined by the pressure sensor 16. Alternatively, the rail pressure $P_R(S)$ may be a function of the pressure generated by the high pressure pump 30 and the flow rate of fuel though the rail 14. The drain flow shape $D(S)$ is the quantity of fuel in a given pulse that does not enter the cylinder of the engine 10. In particular, when the injector 12 is actuated, fuel leaves the injector 12 in two places: (1) through spray holes in a nozzle of the injector 12 and into the cylinder and (2) through an injector pilot valve to a fuel drain circuit (not shown in FIG. 1). The fuel drain circuit is provided for draining residual fuel from the injector body volume to a low pressure drain. The injector pilot valve is positioned in the fuel drain circuit for controlling the flow of fuel through the drain circuit. The drain flow event generally precedes the injection event by a few hundred microseconds. A drain flow quantity from the drain flow shape $D(S)$ may generally comprise approximately 10-15% of the total injected fuel for large fueling quantities. However, the drain flow quantity may be lesser or greater in certain embodiments.

The injector capacitance $C_I$ is related to the injector body volume and represents the pressure difference in the injector body volume required to cause a change in the flow rate of the fuel. The damping ratio $\xi$ represents the pressure losses in the fuel path from the rail 14 to the injector 12, including but limited to losses resulting from changes in the flow area from the rail 14 to the injector 12 and fuel hysteresis. The natural frequency $\omega_n$ represents a rate of oscillation of the fuel within the injector body caused by EOI when the injector 12 is closed and the mass of fuel in the lines connecting the injector 12 to the rail 14, the mass having a momentum, interacts with the compliance of non-injected fuel in the injector body. Inspection of FIGS. 2A-2C indicates that the oscillation of the body pressure wave may be modeled as a simple harmonic system (e.g., a Helmholtz resonator) having the natural frequency $\omega_n$. Accordingly, the form of EQ. 1 includes certain aspects of a model of a simple harmonic system.

The injection rate shape U(S) may be determined from the performance characteristics of the fuel injector. In at least one embodiment, the injection rate shape U(S) may be derived from the fueling-to-ontime characteristics of the injector 12, which may be stored in a look-up table having two inputs, fueling command and measured rail pressure, and one output, the injector on-time required to produce the desired fueling quantity at the measured pressure. However, the determining fueling-to-ontime characteristics of the injector 12 may change over time with use of the injector due to wear, fouling, debris, etc. Moreover, fuel injectors generally exhibit delay periods after an actuation command of the injector (e.g., opening or closing) and can experience variations in the injector response during fuel injection, particularly as the injector wears with use. Such variations affect the actual injected fuel quantity versus the commanded amount of fuel. Accordingly, information is needed to properly identify the performance characteristics of each fuel injector. One approach is to characterize the injector from initial calibration data, from data entered at a time of manufacture, and/or from data taken during a previous operation of the system and stored as a contemporary characterization of the injector at the time the data is taken. However, as noted, the performance characteristics of the injector generally vary over time due to use. Another approach is to use a model to estimate the actual injection rate shape U(S) of a given fuel injector over time. Though any suitable injection rate shape estimation model may be used for input into EQ. 1 as described herein, one such model is summarized as follows.

Figure 3:
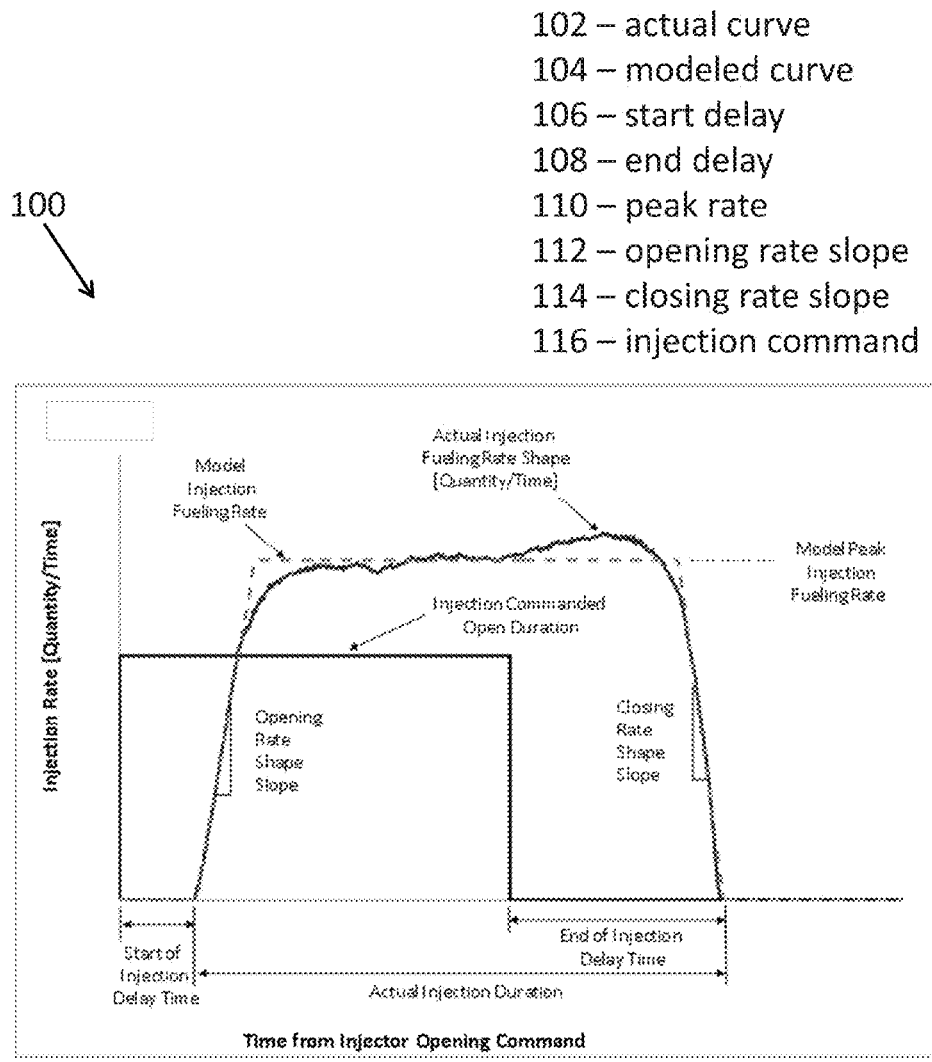
FIG. 3 is a schematic diagram of an exemplary fuel injection relationship.

For a system employing closed-loop fueling control based on single pulse measurements, the variable fuel injector characteristics may be calculated using the actual injected fuel quantity. For a single injection pulse, the injected fuel quantity is a function of the initial pressure, the commanded on-time, and the calculated injector characteristics, which may be modeled as follows. Referring to FIG. 3, illustrative data 110 depicts an illustrative "actual" injection rate shape 102 with a modeled injection rate shape 104. The actual injection rate shape 102 is a representative example of what an actual injection rate shape might look like and does not represent an actual rate shape for any specific fuel injector. As shown in FIG. 3, for the actual injection rate shape 102, a trapezoidal injection rate shape may be used to closely approximate the injected fuel rate, especially where the area under the curves must be matched (representing the total fuel injected) rather than the instantaneous injected fueling quantities. The curves 102, 104 are responses of an injector to an injection command 116, which illustrates a command to open the injector at time zero, and a command to close the injector at a later time when the command value returns to zero.

Both the trapezoidal model curve 104 and the actual curve 102 exhibit a start delay time 106 before the injector is open and fuel injection begins and an end delay time 108 that occurs at some period of time after the injection command returns to zero (or OFF). The start delay time 106 and end delay time 108 are normal responses of a properly functioning injector and are predictable. Accordingly, the start delay time 106 and end delay time 108 may be indicative of injector performance.

Both the trapezoidal model curve 104 and the actual curve 102 exhibit an opening rate shape slope 112 and a closing rate shape slope 114, which are linear in the real system through a large portion of the opening and closing events. The trapezoidal model curve 104 includes a peak injection rate 110 portion. While the actual curve 102 exhibits some rate increase throughout the injection event until some time period after the injection command 116 returns to zero, a single peak injection rate 110 can nevertheless provide an injection rate shape that closely estimates the quantity of fuel injected throughout the fueling event. In certain embodiments, a quadrilateral or other shape may be used for the approximation, allowing for a slope or other function during the peak injection period after the injection rate rise and before the injection rate fall. For example, in at least one embodiment, the actual injection rate shape may be modeled by a boot shaped initial injection rate shape followed by an approximately trapezoidal rate shape.

The values of delay times 106, 108, peak rates 110, and rise and fall slopes 112, 114 are dependent upon the system operating conditions. For example, a given set of values may be dependent upon the fuel rail pressure of the system. In certain additional or alternative embodiments, the on-time of the injection command, the temperature of the fuel in the rail, the engine speed of the engine having the fuel system, the discharge pressure of the injector, and/or any other parameter affecting the fuel injection quantity may be utilized as system operating conditions. Accordingly, multiple values for each modeling parameter (i.e., delay times 106, 108, peak rates 110, rise and fall slopes 112, 114) may be stored corresponding to various operating conditions, and/or values for the modeling parameters stored as functions of the operating conditions may be stored.

Figure 4:
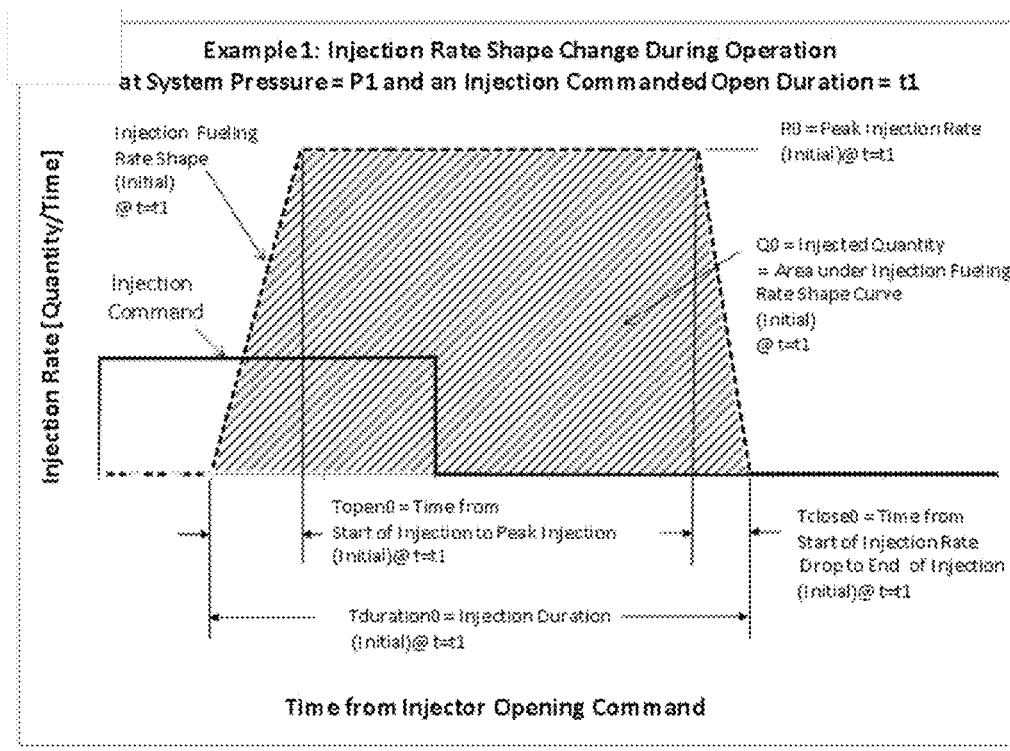
FIG. 4 is a schematic diagram of another embodiment of a fuel injection relationship.

Referring to FIG. 4, an initial condition for an operating pressure P1 and a commanded injection time T1 is depicted as data 200. The data 200 may be determined from initial calibration data, data entered at a time of manufacture, and/or data taken during a previous operation of the system and stored as a contemporary characterization of the injector at the time the data is taken. The data 200 includes a modeled curve 204 for the fueling quantity, a start delay 206 and an end delay 208, along with a peak rate 210 for the fueling. The data 200 in the example stores an opening time to peak 212, and a closing time from peak 214, contrasted with but equivalent to the slopes 112, 114 stored in the data from FIG. 3. Slopes, rise-times and fall-times, or any equivalent data structures may be utilized to characterize the rising and falling injection rate descriptions. The data 200 also includes a total injection duration 218, which may alternatively or equivalently be stored as a time at peak fueling or some other time from which the total fueling quantity can be determined. The area under the modeled curve 204 is the total fueling quantity for the injection event depicted in the data 200.

Figure 5:
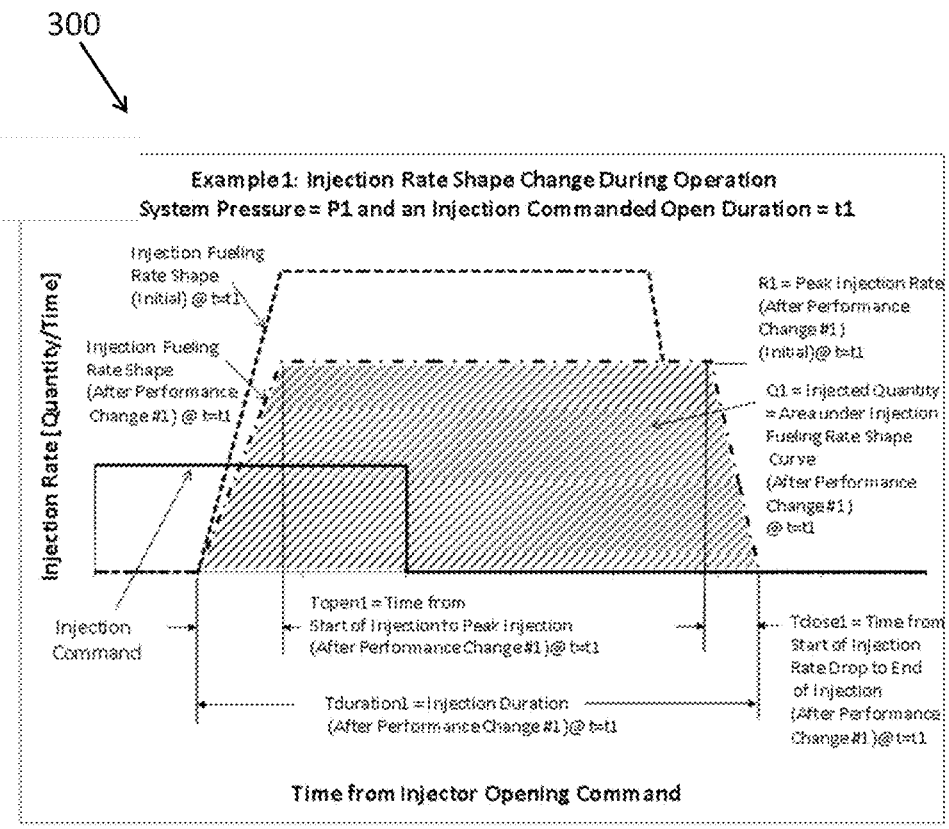
FIG. 5 is a schematic diagram of a fuel injection relationship and an adjusted fuel injection relationship.

Referring to FIG. 5, an adjusted condition for the operating pressure P1 and the commanded injection time T1 is depicted as adjusted curve 304. The adjusted curve 304 is determined by utilizing a fuel quantity virtual sensor in real time, and determining the adjusted start delay 306, adjusted peak rate 310, and adjusted end delay 308. The area under the adjusted curve 304 represents the total fuel quantity injected during the fueling event at P1, T1, which may be measured for a given commanded injection time T1. Knowledge of the area under the adjusted curve 304 (i.e., the total fuel quantity injected) and further injection characteristics enables determination of the injection rate shape as described herein. Additionally or alternatively, the adjusted curve 304 may be used to diagnose the injector, for example when any one or more of the adjusted start delay 306, adjusted end delay 308, and/or adjusted peak rate 310 are greater than a predetermined amount different than a nominal value. Additionally or alternatively, the adjusted curve 304 may be utilized to adjust offset data, for example where an adjusted curve 304 is determined for a first pressure P1 and a second pressure P3, the data for a third pressure P2 falling between P1 and P3 may be adjusted similarly to the adjusted data for the pressures P1 and P3. As used herein, adjusting can refer to the process by which the performance of an injector changes or adjusts over time due to wear, fouling, debris, etc. No limitation is intended regarding the scope of the term "adjusting". In some forms "adjusting" can refer to the process by which the injection rate shape is adjusted to account for wear, fouling, debris, etc.

For all operating conditions there can be a direct correlation between the adjusted curve parameters at that condition and the injected fueling quantity. The integrated area under the curve equals the injected fueling quantity at each operating condition. In certain embodiments, a change occurring at one operating condition can be extrapolated to another operating condition or all operating conditions. Accordingly, in one example, an operation to provide a fuel injection event at P1, T1 can adjust the injection start time and/or the commanded injection duration in response to the updated injection delay information and provide for a fueling event that is closer to a designed fueling event. By utilizing relationships between parameters in a control structure, such as the body pressure model and the injection rate shape model, all rate shape defining parameters such as start delay, end delay, peak rate, and slopes can be estimated at all operating conditions including those for which no direct fueling measurement was taken. Any real time fuel quantity virtual sensor, or any fuel quantity sensor, may be utilized. A non-limiting example of an injected fuel quantity estimator is described in U.S. Pat. No. 6,557,530 entitled "Fuel control system including adaptive injected fuel quantity estimation," which is incorporated herein by reference in the entirety for all purposes. Any other suitable injected fuel quantity estimator may be utilized herein to determine adjusted data such as that depicted in FIG. 5. The example injection rate shape modeling concepts described herein may be utilized as a fuel injection model, to update a fuel injection model, and/or to diagnose a fuel injector.

Accordingly, the control structure can be designed to utilize information at multiple operating conditions in order to refine, update, and confirm each of the modeling parameters used to represent the injection rate shape characteristics of an injector during an injection event for all operating conditions. Based on the injector characteristics, some of the injection rate shape defining parameters may have stronger signal to noise ratios at certain operating conditions, which can be advantageously used by the control structure. As an illustrative example, there may be a relatively strong correlation in the relationship between the injected fueling quantity and the opening delay at operating conditions for which the injection quantity is relatively low. As another illustrative example, there may be a relatively strong correlation in the relationship between the peak rate and the rate of change of the injected fueling quantity with respect to the commanded on time at operating conditions for which the injection quantity is relatively high. Though a control structure could determine all the values that define the completed injection rate shape using methods and information based only on the fueling quantity estimation at a singular operating condition, such a control structure would suffer from an inherent uncertainty (i.e., noise) in modeling the needed range of operating conditions. Accordingly, the control structure may use information at multiple operating conditions in order to refine, update, and confirm each of the modeling parameters used to represent the injection rate shape characteristics of an injector during an injection sequence for all operating conditions. By using fueling measurements over a sufficiently wide range of rail pressure and fueling conditions, the inherent uncertainty or noise associated with each individual measurement may be averaged out, and the key characteristics of the injection rate shape may described with a desired level of accuracy. Consequently, the injection rate shape U(S) of a given injector may be estimated using the disclosed rate shape modeling concepts for single-pulse fuel event with sufficient accuracy to provide a useful input into the body pressure model to compensate for the fuel delivered in a multipulse injection sequence, in which the injected fuel quantity for all but the first pulse is a function of the dynamic body pressure created by the preceding pulses.

Figures 6A, 6B, 6C:
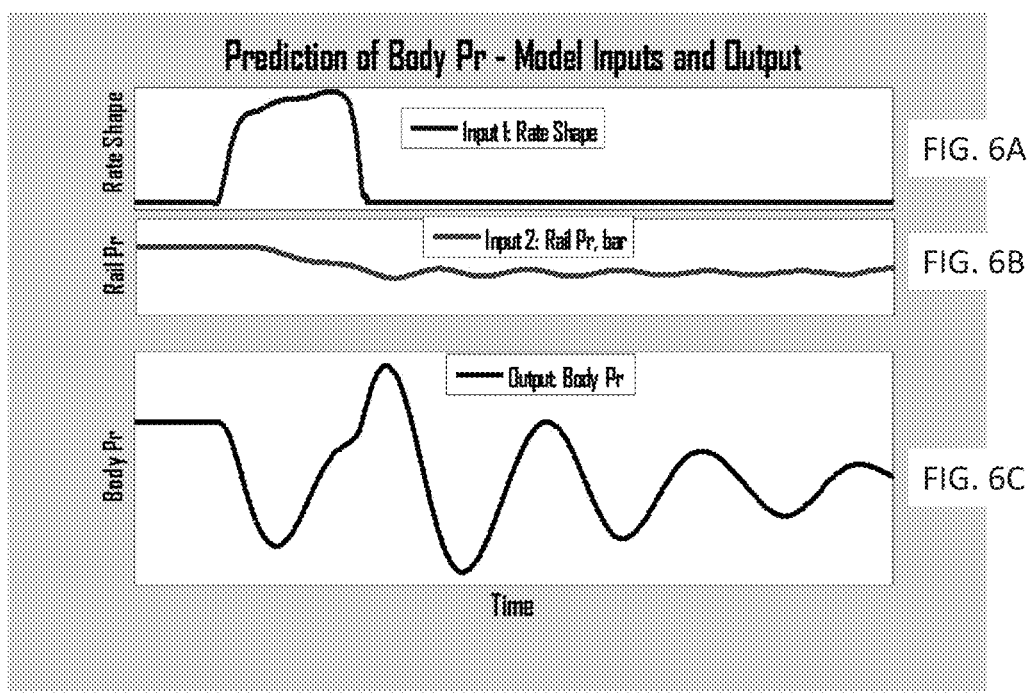
FIG. 6A is a chart of an adjust fuel injection rate shape over time according to an embodiment of the present disclosure.
FIG. 6B is a chart of rail pressure over time according to an embodiment of the present disclosure.
FIG. 6C is a chart of a fuel injector body pressure over time according to an embodiment of the present disclosure.
Figure 7:
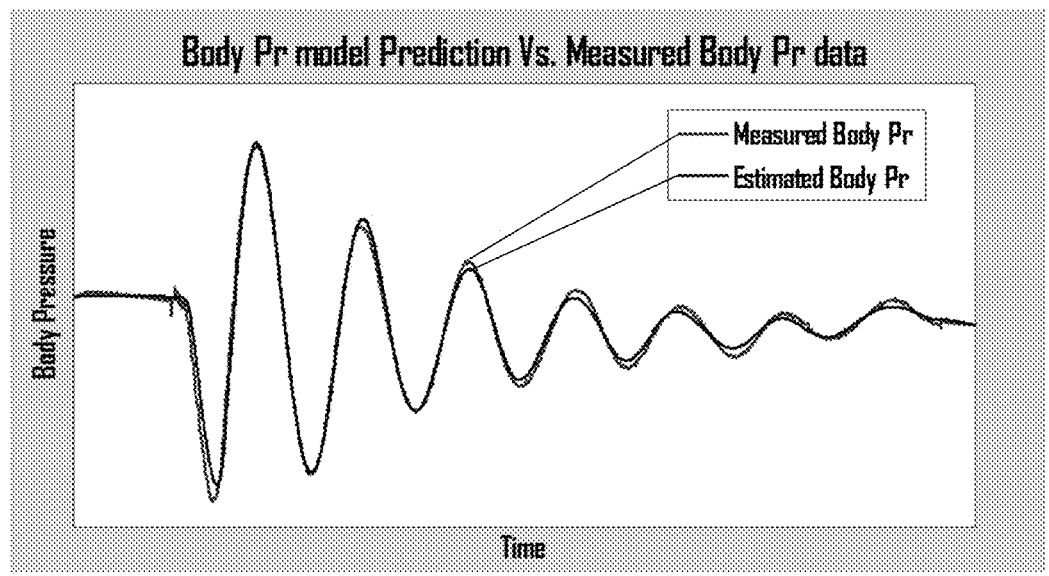
FIG. 7 is a chart of the predicted and actual fuel injector body pressure over time of an engine system according to the present disclosure.

FIG. 6A shows an example injection rate shape U(S) for a fuel injector, which may be input into the body pressure model of EQ. 1. FIG. 6B shows an example rail pressure $P_R(S)$, which may be input into the body pressure model. Applying the body pressure model to the inputs shown in FIGS. 6A and 6B yields the estimated body pressure $P_B(S)$ over time as shown in FIG. 6C. The actual body pressure may be measured using a pressure sensor in the communication with the injector body to validate the body pressure model. Though installing a pressure sensor in each injector body is undesirable because of increased the cost and complexity of an engine system, such a pressure sensor may provide empirical data to compare to the estimated body pressure predicted by EQ. 1. As shown in FIG. 7, the measured body pressure correlates closely with estimated body pressure predicted by the body pressure model of EQ. 1.

Figures 8A, 8B:
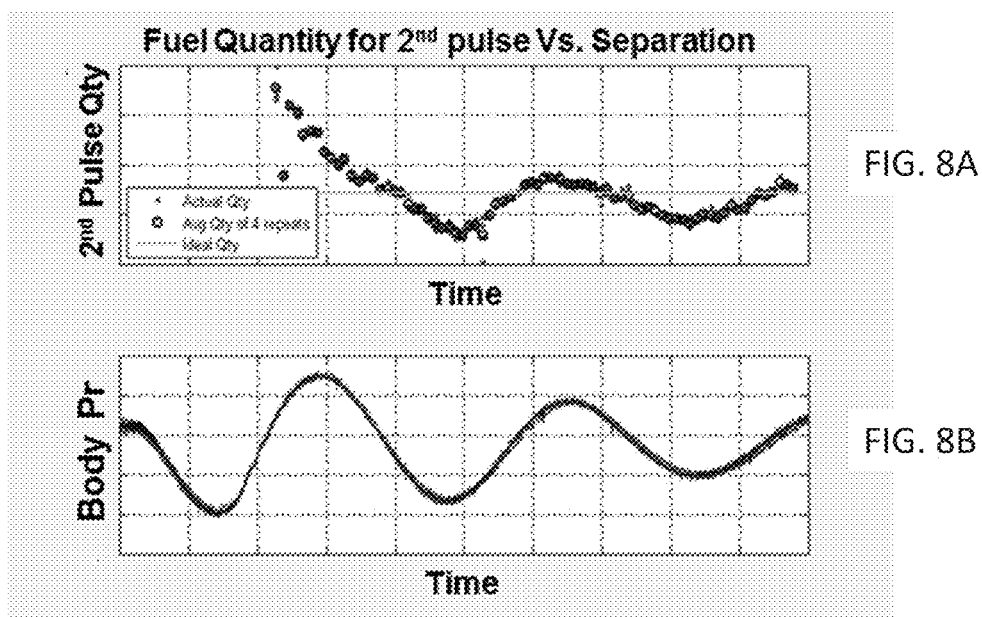
FIG. 8A is a chart of the predicted and actual fuel injector fuel quantity of a second pulse of the fuel injector over time of an engine system according to the present disclosure.
FIG. 8B is a chart of the predicted fuel injector body pressure over time of an engine system according to the present disclosure.
Figure 9:
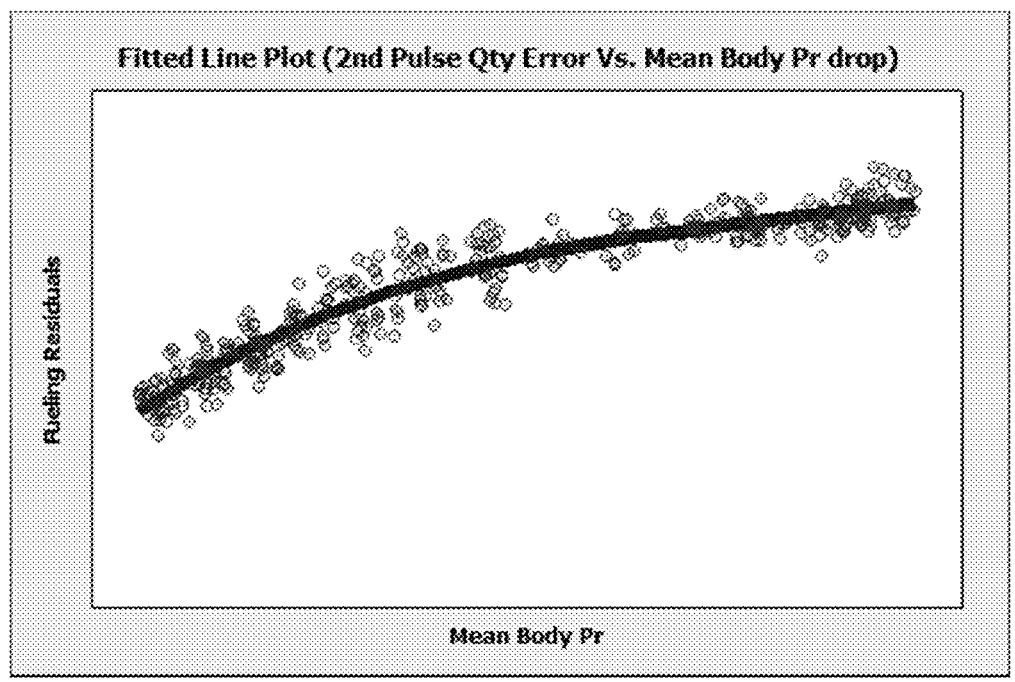
FIG. 9 is a chart of a correlation between a fueling error of a second pulse of the fuel injector and a mean body pressure drop of an engine system according to the present disclosure.

The estimated body pressure predicted by EQ. 1 may be used to estimate the injected fueling quantity of a latter pulse of a multipulse injection sequence. For example, the actual fueling quantity delivered by a second pulse depends on when the second pulse is commanded relative to the dynamic body pressure wave generated by an initial pulse. FIG. 8A shows empirical and model data for the injected fueling quantity of a second pulse of a two-pulse injection sequence, where the body pressure at the time of the second pulse as modeled by EQ. 1 is shown in FIG. 8B. A comparison of FIGS. 8A and 8B indicates that the injected fueling quantity of the second pulse is greater than the target value when the estimated body pressure is above a nominal value. Specifically, the injected fueling quantity of the second pulse is significantly above the target value when the estimated body pressure wave is approaching or near a peak pressure value. Similarly, the injected fueling quantity of the second pulse is less than the target value when the estimated body pressure below the nominal value. More generally, both the actual and predicted injected fueling quantity of the second pulse oscillate in harmony with the estimated body pressure as modeled by EQ. 1. Moreover, the body pressure model yields an estimated injected fueling quantity that correlates closely with empirical data as seen in FIG. 8A. Further, FIG. 9 shows the correlation between body pressure and the injected fueling quantity of the second pulse as a function of the error or deviation of the fueling quantity versus the mean body pressure delta from nominal. The solid line through the data of FIG. 10 represents a simple regression curve fit to the data, which is tightly distributed about the curve fit.

Consequently, the body pressure model of EQ. 1 enables the close estimation of the effect of the body pressure wave on the actual injected fueling quantity delivered from a latter pulse of an injector in a multipulse injection sequence, thereby enabling the timing, duration, and/or separation of the latter pulse to be adjusted to yield the desired total injected fueling quantity for the multipulse injection sequence. In certain embodiments, the centroid of a pulse may be adjusted to generate a desired fueling outcome by adjusting command parameters of the control structure. Further, the body pressure model may be extended to a third or any number of latter injection pulses. By applying the model to the conditions predicted for a latter pulse, the body pressure at the time of a third or subsequent pulse may be estimated and used to calculate the injected fueling quantity given the estimated body pressure, and so on sequentially for each pulse. Thus, the injected fueling quantity for each individual pulse of a multipulse injection sequence may be estimated, which enables the timing, duration, centroid, and/or separation of each latter pulse to be adjusted such that the multipulse injection sequence yields the desired total injected fueling quantity. Moreover, the body pressure model may be further formulated to output an injector command on-time or separation adjustment as a function of desired fuel quantity, desired SOI, body pressure, body pressure rate, and other injector characteristics. Further, the disclosed method may enable feedback regarding the total fuel quantity delivered in a multipulse injection sequence, which, aside from the injection characteristic that are determined uniquely for each injector as described herein, is a form of open-loop control. Consequently, such total fueling quantity feedback may be most advantageous for two-pulse multipulse injection sequences in which any error in the open-loop compensation control structure corresponds directly with the latter (i.e., second) pulse.

The controller 20 may be exclusively dedicated to estimating an injected fuel quantity and relating that fuel quantity to one or more command parameters associated with the definition of an injection pressure response parameter associated with an injector body pressure model. In certain embodiments, the controller 20 may include one or more modules 22 structured to functionally execute the operations of the controller 20. The description herein including modules 22 emphasizes the structural independence of the aspects of the controller 20, and illustrates one grouping of operations and responsibilities of the controller 20. Other groupings that execute similar overall operations are understood within the scope of the present application. Modules may be implemented in hardware and/or software on a non-transient computer readable storage medium, and modules may be distributed across various hardware or software components.

Figure 10:
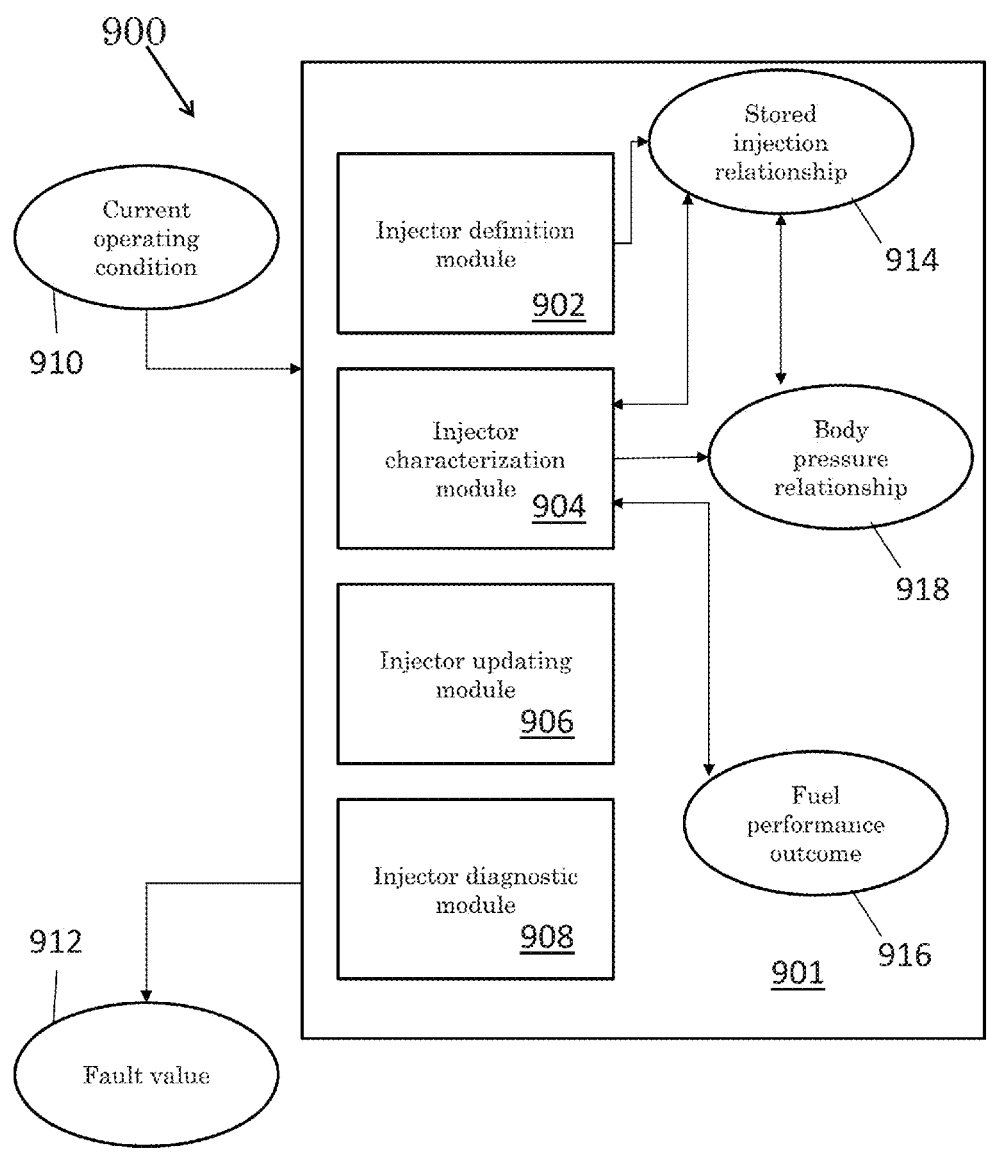
FIG. 10 is a schematic flow diagram of a method for controlling emissions from an engine system according to the present disclosure.

FIG. 10 is a schematic illustration of a processing subsystem 900 including a controller 901 structured to controller one or more fuel injectors in a multipulse fuel injection sequence. The controller 900 may include an injector definition module 902 that interprets a stored injection relationship 914. An example stored injection relationship 914 includes a number of fuel command parameters corresponding to a number of fuel performance parameters at a specified operating condition. The controller 900 may include an injector characterization module 904, which determines a fueling outcome 916 during a fuel injection sequence, and an injector updating module 906 that interprets a current operating condition 910 and updates the stored injection relationship 914 in response to the fueling outcome 916 and the current operating condition 910. The controller 901 may further include an injector diagnostic module 908 that provides a fault value 912 in response to the fueling outcome and the current operating condition.

An example stored injection relationship 914 includes an injection rate shape model such as described in FIGS. 3-5 before adjustment, and an example update to the stored injection relationship 914 includes an updated model after adjustment, such as depicted in FIGS. 4 and 5 after adjustment. The stored injection relationship 914 may include an injection rate shape model corresponding to a fuel pressure value and an injector commanded on-time. The stored injection relationship 914 may further include a start of injection delay, an end of injection delay, a peak injection rate, a time from start of injection to peak injection, a time from start of injection rate drop to end of injection, an opening rate shape slope, and/or a closing rate shape slope. In certain embodiments, the controller 901 may include the current operating condition 910 being a fuel rail pressure, a fuel temperature, an injector discharge pressure, an engine operating speed, and an injector commanded on-time.

In at least one embodiment according to the present disclosure, the controller 901 may include an injector body pressure relationship 918, which may include an injector body pressure model corresponding to a fuel pressure value, a fuel temperature value, and/or an injector commanded on-time. The injector body pressure relationship 918 may further be incorporated with the stored injection relationship 914 to determine an injector body pressure given the stored injection relationship 914 at the injector commanded on-time at specified operating conditions. The injector body pressure relationship 918 may be interpreted by the injector definition module 902.

The schematic flow descriptions that follow provide illustrative embodiments of performing operations for adjusting control of a fuel injector. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

A method of controlling a fuel injector according to the present disclosure may include an operation to interpret an injector characteristic, the injector characteristic including a command value to injection quantity relationship. The method may include an operation to define an injector body pressure model for the fuel injector that includes a rail pressure and an injection rate shape. The method may further include an operation to apply the injector body pressure model to a preceding pulse of a multipulse injection sequence of the fuel injector to determine the body pressure at a command on-time of a latter pulse. The method may further include an operation to determine a fueling outcome of the multipulse injection sequence and to update at least one of a plurality of fuel command parameters in response to the fueling outcome.

The method may include an operation to interpret an injection rate shape and a rail pressure and to calculate a body pressure at the command value to determine an injected quantity of the injector during a multipulse injection fueling sequence of the injector. The method may further include an operation to determine an injection deviation value in response to the injected quantity relative to a fueling command value. The method may further include an operation to update the injector characteristic in response to the injection deviation value and the body pressure. An example injector characteristic may include an injection rate shape, a start of injection delay, an end of injection delay, a peak injection rate, a time from start of injection to peak injection, a time from start of injection rate drop to end of injection, an opening rate shape slope, and/or a closing rate shape slope.

A further example injector characteristic may include a command value to injection quantity relationship at a specified operating condition. Example specified operating conditions include a fuel rail pressure, a fuel temperature, an injector body pressure, an engine operating speed, and/or an injector commanded on-time. An example method may further include providing a fault value in response to the injection deviation value.

Another example set of embodiments is an apparatus including an injector definition module that interprets an injector body pressure relationship, where the injector body pressure relationship includes a rail pressure at a specified operating condition. The injector body pressure relationship may further incorporate a stored injection relationship. The apparatus includes an injector characterization module that determines a fueling outcome during a fuel injection sequence, and an injector updating module that interprets a current operating condition and updates the injector body pressure relationship and stored injection relationship in response to the fueling outcome and the current operating condition.

Yet another example set of embodiments is a system including an internal combustion engine including a common fuel rail and at least one common rail fuel injector, a means for modeling the fuel injector fuel quantity delivered from a multipulse injection sequence of the fuel injector as a function of a rail pressure of the fuel rail, and a means for updating the model of the fuel injector fuel quantity and/or diagnosing the fuel injector in response to a current operating condition and a command fueling quantity during a multipulse fuel injection sequence. In certain embodiments, the means for modeling the fuel injector fuel quantity delivered includes an injector body pressure estimate.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

A variety of embodiments according to the present disclosure are contemplated. Such system embodiments may be employed in a variety of methods, processes, procedures, steps, and operations as a means of controlling a fuel injector for an engine. While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. Indeed, this disclosure is not intended to be exhaustive or to limit the scope of the disclosure.

What is claimed is:

1. An apparatus comprising:
a fuel sequence controller configured for use with a fuel injector having an injector configuration modeled by a body pressure characteristic that includes a rail pressure and an injection rate shape, wherein the injector configuration includes a multipulse injection sequence in which each pulse has a command on-time and off-time, the fuel sequence controller structured to determine the body pressure characteristic corresponding to the injector configuration by operating upon the rail pressure and the injection rate shape at a preceding pulse of the multipulse fuel injection, the fuel sequence controller further structured to determine an estimate of the injected fuel quantity to be delivered from a latter pulse of the fuel injector at the determined body pressure characteristic and to adjust the latter pulse in response to the estimate, wherein the body pressure characteristic includes a pressure within a body of the fuel injector.

2. The apparatus of claim 1, wherein the body pressure characteristic further includes one or more of a drain flow shape, an injector capacitance, a damping ratio, and a natural frequency of the body of the fuel injector.

3. The apparatus of claim 1, wherein the fuel sequence controller is further structured to adjust the command on-time and off-time of one or more pulses of the injector configuration to adjust the injected fuel quantity.

4. The apparatus of claim 1, wherein the fuel sequence controller is further structured to adjust a centroid of one or more pulses of the injector configuration.

5. The apparatus of claim 1, where the body pressure characteristic is one of a mathematical relationship, a regression equation, an adaptive table, and a combination thereof.

6. The apparatus of claim 1, wherein the estimate of the injected fuel quantity is a function of operating parameters that include at least one of a fuel pressure value, a fuel pressure rate, a fuel temperature value, and/or an injector commanded on-time.

7. The apparatus of claim 1, wherein the fuel sequence controller is further structured to determine a body pressure characteristic rate corresponding to the injector configuration by operating upon the rail pressure and the injection rate shape.

8. A system comprising:
an internal combustion engine including a common fuel rail and at least one common rail fuel injector, the fuel injector capable of a multipulse fuel injection sequence;
a means for modeling the fuel injector fuel quantity to be delivered from a latter pulse of the multipulse fuel injection sequence of the fuel injector as a function of a rail pressure of the fuel rail and an injection rate shape at a preceding pulse of the multipulse fuel injection; and
a means for updating the model of the fuel injector fuel quantity and/or diagnosing the fuel injector in response to the modelled fuel injector quantity from the latter pulse, a current operating condition and a command fueling quantity.

9. The system of claim 8, wherein the means for modeling the fuel injector fuel quantity delivered includes an injector body pressure estimate.

10. The system of claim 9, wherein the injector body pressure estimate includes the rail pressure.

11. The system of claim 9, wherein the injector body pressure estimate includes a stored injection relationship.

12. The system of claim 8, wherein the means for updating the model of the fuel injector fuel quantity includes adjusting a timing of one or more fueling commands of the multipulse fuel injection sequence.

13. The system of claim 8, wherein the means for updating the model of the fuel injector fuel quantity includes adjusting a centroid of one or more pulses of the multipulse fuel injection sequence.

14. A method, comprising:
defining an injector body pressure model for a fuel injector that includes a rail pressure and an injection rate shape;
applying the injector body pressure model to the rail pressure and the injection rate shape of a preceding pulse of a multipulse injection sequence of the fuel injector to determine an estimate of the body pressure at a command on-time of a latter pulse;
determining an estimate of a fueling outcome for the latter pulse of the multipulse injection sequence of the injector; and
updating at least one of a plurality of fuel command parameters to adjust the actual fueling outcome for the latter pulse in response to the estimate of the fueling outcome.

15. The method of claim 14, wherein the injector body pressure model further includes one or more of an injection rate shape, drain flow shape, an injector capacitance, a damping ratio, and a natural frequency of the body of the fuel injector.

16. The method of claim 14, the method further comprising:
interpreting an injection rate shape and the rail pressure and to calculate a body pressure at a command value to determine the fueling outcome of the multipulse injection fueling sequence of the injector;
determining an injection deviation value in response to the fueling outcome; and
updating an injector characteristic in response to the injection deviation value and the body pressure, wherein the injector characteristic includes an injection rate shape, a start of injection delay, an end of injection delay, a peak injection rate, a time from start of injection to peak injection, a time from start of injection rate drop to end of injection, an opening rate shape slope, and/or a closing rate shape slope.

17. The method of claim 14, wherein the fueling outcome includes a total injected fuel quantity delivered from the fuel injector during the multipulse injection sequence.

18. The method of claim 16, wherein the estimate of the injected fuel quantity is further a function of operating parameters that include at least one of rail pressure, body pressure, commanded on-time, operating speed, and temperature.

19. The method of claim 14, wherein the fuel command parameters include a command on-time and off-time of each pulse of the multipulse injection sequence.

* * * * *